United States Patent

Commesso

Patent Number: 5,207,260
Date of Patent: May 4, 1993

[54] ADJUSTABLE RESTRAIN SYSTEM FOR ARTICLES

[76] Inventor: Domenic V. Commesso, 327 Atwood Ave., Waterbury, Conn. 06705

[21] Appl. No.: 800,235

[22] Filed: Nov. 29, 1991

[51] Int. Cl.$^5$ ............................................. A47G 5/00
[52] U.S. Cl. ...................................... 160/135; 160/351; 296/24.1; 296/37.16; 410/118
[58] Field of Search ............... 160/135, 85, 86, 327, 160/351; 410/119, 118, 117, 122, 123, 124, 129, 130; 296/37.1, 37.7, 37.16, 24.1

[56] References Cited

U.S. PATENT DOCUMENTS

| | | |
|---|---|---|
| 1,705,060 | 3/1929 | Hintz . |
| 2,808,290 | 10/1957 | Nelson ................................. 296/37 |
| 2,855,037 | 10/1958 | Stiffel ................................. 160/135 |
| 3,044,800 | 7/1962 | Wicker ............................ 296/24.1 X |
| 3,049,373 | 8/1962 | Biggers ........................... 296/24.1 X |
| 3,195,745 | 7/1965 | Cretsinger . |
| 3,438,673 | 4/1969 | Nelson . |
| 3,652,120 | 3/1972 | Bernbach ......................... 296/24.1 |
| 4,436,466 | 3/1984 | Marino ............................ 410/129 X |
| 4,540,213 | 9/1985 | Herlitz et al. ..................... 296/37.5 |
| 4,964,771 | 10/1990 | Callihan ............................ 410/118 |
| 4,969,500 | 11/1990 | Makosa ............................. 160/135 |
| 5,054,837 | 10/1991 | Chapman ......................... 296/24.1 |

Primary Examiner—David M. Purol
Attorney, Agent, or Firm—Bachman & LaPointe

[57] ABSTRACT

The present invention relates to an adjustable restraint system for confining articles within a desired space in a storage compartment such as an automobile trunk. One embodiment of the restraint system includes at least two posts positioned within the storage compartment and a piece of fabric secured to one of the posts for defining the storage space. The system further includes a fastener for maintaining the fabric in a taut condition and thereby preventing movement of the articles within the storage compartment. The posts are preferably adjustable in height so that the system of the present invention may be used in different dimensioned storage compartments. In another embodiment of the present invention, multiple posts and multiple pieces of fabric are used to form multiple article storage spaces.

13 Claims, 2 Drawing Sheets

ADJUSTABLE RESTRAIN SYSTEM FOR ARTICLES

BACKGROUND OF THE INVENTION

The present invention relates to an adjustable restraint system for confining articles within a desired space within a storage compartment such as an automobile trunk.

Storage compartments on automobiles and other mobile vehicles are used to transport articles such as packages, grocery bags, luggage, boxes and the like. Unrestrained these articles are free to move about the storage compartment in response to vehicle movement and sudden stops. Often, packages will slide to the rear of the storage compartment, making it difficult for individuals to reach them. Grocery bags will turn over or fall on their side causing damage to the food products therein. Thus, it is highly desirable to provide some means for restraining articles within these storage compartments during vehicle movement.

A number of restraining devices have been developed over the years. One of the earliest approaches for restraining or stowing cargo is shown in U.S. Pat. No. 1,705,060 to Hintz. In this approach, relatively thin binders are used to draw a plurality of packages together. The binders are temporarily supported in spaced relation to each other by supports adapted to be applied to walls of the vehicle or carrier. The packages to be restrained are loaded into a space at least partially surrounded by the binders. Tension is then applied to the binders to draw them tightly around the packages. The application of tension to the binders detaches the temporary supports from the walls. While this type of approach has commercial applications, it really has no utility in day-to-day ordinary applications such as bringing home groceries from the supermarket.

More typical article restraining systems employ anchor devices mounted to the walls of a storage compartment and one or more flexible tie members secured to the anchor devices for engaging and restraining articles. U.S. Pat. No. 3,438,673 to Nelson illustrates a luggage retainer wherein metal anchoring devices are mounted to the walls of an automobile trunk. The anchoring devices each have a plurality of eyes through which nylon cords are laced. U.S. Pat. No. 4,964,771 to Callihan illustrates a similar article restrainer having a plurality of wall mounted anchors, a flexible panel for engaging the article(s) to be restrained, and a plurality of cords passing through the sleeves in the flexible panel to suspend the flexible panel between the anchors. Locking means are provided to keep the cords in a taut condition. The article or articles to be restrained are positioned between the flexible panel and a wall of the vehicle.

U.S. Pat. No. 2,808,290 to Nelson illustrates a cargo restraining device for use with rear decks on automobiles. The device includes a wall anchor, a restraining sheet of flexible material mounted at one end to the wall anchor and mounted at the other end to a U-shaped anchoring member, and a bracket mounted to the underside of the deck for engaging the U-shaped anchoring member.

U.S. Pat. No. 4,540,213 to Herlitz et al. illustrates another type of fixed cargo restraining system. In this system, a series of article storage spaces are defined by a plurality of slats fixedly secured to the floor of a cargo space by hinges, a transverse cross rail connected to the slats, brackets mounted to walls of the storage compartment and tie members connected to the cross rail having loops to be attached to the brackets. In its raised mode, this system defines compartments in which cargo such as grocery bags may be supported.

Another type of restraining system which has been used is a pallet type system where cargo is secured to a pallet or a tray and the pallet or tray is placed within the cargo compartment and secured in position by a locking mechanism. One such system is illustrated by U.S. Pat. No. 3,195,745 to Cretsinger. Such systems are not particularly useful since the hardware used to secure the tray or pallet is very complex and takes up valuable space in the cargo compartment.

There remains a need for a simple cargo restraining device which effectively holds articles in a desired location and which can be readily removed from the storage compartment when not needed. One of the principal deficiencies of the prior art restraint systems is their reliance upon elements fixedly secured to the walls of the storage compartment.

Accordingly, it is an object of the present invention to provide a restraint system for confining articles within a desired space within a storage compartment.

It is a further object of the present invention to provide an article restraint system as above which is adjustable and may be used in a wide variety of vehicles.

It is yet a further object of the present invention to provide a restraint system as above which may be easily removed from the storage compartment when not required and easily stored.

It is still a further object of the present invention to provide a restraint system as above which is relatively inexpensive to produce and simple to use.

These and other objects and advantages of the present invention will become clearer from the following description and drawings wherein like reference numerals depict like elements.

SUMMARY OF THE INVENTION

The foregoing objects are attained by the article restraint system of the present invention which includes at least two adjustable posts positioned within a vehicle storage compartment. Each post is adjustable in height so that the restraining system of the present invention may be used in different sized storage compartments. In some alternative embodiments of the present invention, the article restraint system includes four adjustable posts.

The article restraint system of the present invention further includes a piece of fabric connected to one of the posts. The fabric is used together with the posts to define the space in which the article or articles are to be confined. Suitable means such as a VELCRO fastening system are provided to maintain the fabric in a locked and taut condition.

While the present invention has broad utility, it has been found to be particularly useful in restraining the movement of articles placed in an automobile trunk.

Other details of the present invention will become more apparent from the following description.

DETAILED DESCRIPTION

Figure 1:
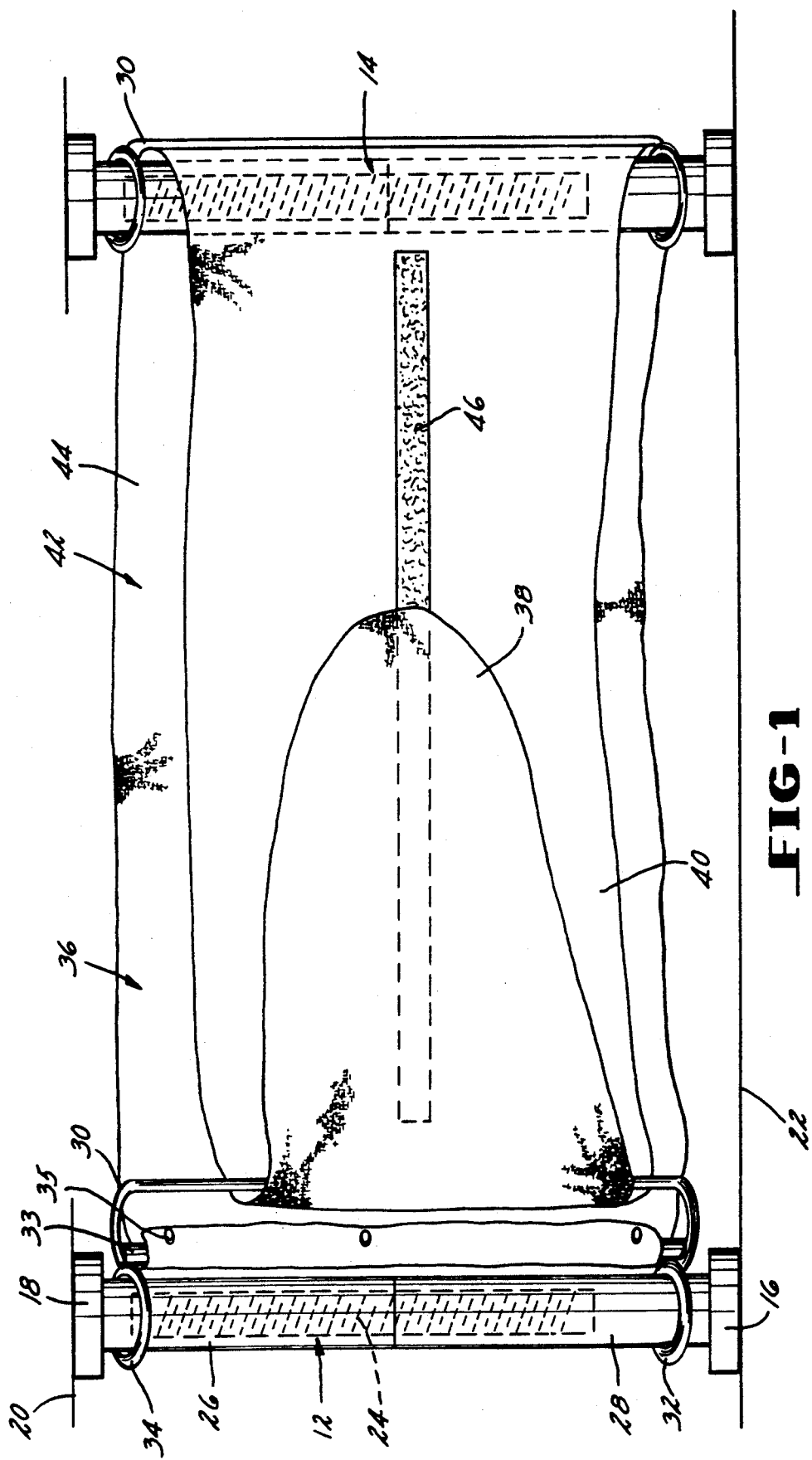
FIG. 1 illustrates a first embodiment of the article restraint system of the present invention.

Referring now to the drawings, the article restraint system of the present invention has at least two spaced apart metal posts 12 and 14. Each post 12 and 14 is preferably adjustable in length or height so as to allow the system of the present invention to be used in a wide variety of different sized storage compartments.

Each post 12 and 14 is provided with a lower contact pad 16 mounted to a lower portion 28 and an upper contact pad 18 mounted to an upper portion 26. The upper and lower contact pads 16 and 18 enable the posts to be placed in a desired location within the storage compartment and be wedged or held in a desired position by frictional engagement between the pads and the upper and lower surfaces 20 and 22 of the storage compartment. The contact pads may be fabricated from any suitable elastomeric material known in the art. Preferably, they are formed from rubber or some other elastomeric material.

As previously mentioned each post 12 and 14 includes an upper portion 26 and a lower portion 28. Each post also includes an adjustment means 24 which preferably allows the upper portion to move relative to the lower portion and thereby increase or decrease the height of the post. Typically, each post is adjustable between a height of from about 12 inches to about 24 inches. The adjustment means may comprise a threaded screw portion 24 as shown in FIG. 1.

Alternatively the adjustment means 24 may be a plurality of holes (not shown) in a central internal member connected to the upper contact pad 18. The holes mate with a plurality of holes (not shown) in portions 26 and 28 of the post. A pin for engaging mating pairs of holes is provided. In this type of system, the upper pad 18 moves relative to the remainder of the post to increase the height of the post.

A substantially C-shaped guide rod 30 is attached to each post for reasons which will be discussed hereinafter. The guide rod 30 is preferably secured to the lower portion 28 of the post by a stationary ring member 32 and to the upper portion 26 of the post by slip ring member 34. The slip ring member 34 is needed to accommodate the height adjustments of the post. The stationary ring member 32 may be affixed to the lower portion 28 using any suitable means known in the art. The guide rod 30 may be formed from either metal or a rigid plastic material; while the ring members 32 and 34 may be formed from any suitable material known in the art.

The article restraint system further includes a length of resilient fabric 36 secured to one of the posts, for example, the post 12. The fabric in conjunction with the posts defines the boundaries of the space 42 into which the article(s) will be placed. The fabric 36 may be connected to the post 12 using any suitable means known in the art. For example, the fabric 36 may be connected to the upper and lower slip ring members and/or upper and lower portions of the substantially C-shaped guide rod via a rod 33 welded or otherwise joined to the rod 30. In such an arrangement, a piece of the fabric 36 is looped around the rod 33 and fastened to the main body of the fabric by eyelets 35 or stitching (not shown).

The fabric 36 should be sufficiently strong to withstand the weight of the article(s) to be restrained pressing against it as well as being sufficiently high as to keep the enclosed article(s) in an upright position. In a preferred embodiment of the present invention, the fabric 36 comprises a piece of heavy canvas material about 12 inches high.

The fabric 36 is preferably provided with a strip 46 of VELCRO fastening material on one surface having any desired length. The strip 46 may be positioned at a level which is about one-half of the overall height of the fabric 36 and may extend from a point adjacent the portion of the fabric near the post 14 to a point near the free edge 38. In this way, it is possible to maintain the fabric 36 in a taut and locked condition by overlapping portions of the fabric containing the VELCRO strip.

As shown in FIG. 1, the fabric 36 connected to the post 12 passes around the post 14 and through a space defined by a surface of the post 14 and the guide rod 30 attached thereto. The fabric then continues on around the guide rod 30 attached to the post 12 through a space between an outer surface of the post 12 and the guide rod 30 until the free edge 38 of the fabric overlaps a fabric portion 40. The space may be between the rod 33 and the rod 30 depending upon the orientation of the two rods relative to each other. As previously discussed, the fabric 36 may be held in a taut condition by joining the VELCRO strip on the back side of the free edge 38 to the VELCRO strip on the portion 40. In this type of arrangement, an article storage space 42 is defined between the portion 40 and the rear portion 44 of the fabric. With the fabric in a taut condition, the articles within the space 42 are restrained from movement within the storage compartment and may be readily maintained in an upright condition.

One advantage to this approach is that the articles may be placed in a desired position before the fabric is passed around the guide rod 30 attached to the post 12 and made taut. Another advantage is that the fabric can be released from in front of the articles when they are to be removed from the storage compartment, thereby facilitating article removal. Still further, this arrangement enables the system to be used in a wide variety of different sized storage compartments since the system can readily accommodate different spacings between the posts. Yet another advantage to this system is that the posts 12 and 14 and the fabric 36 are easily removable from the storage compartment and may be stored in a relatively compact fashion.

Figure 2:
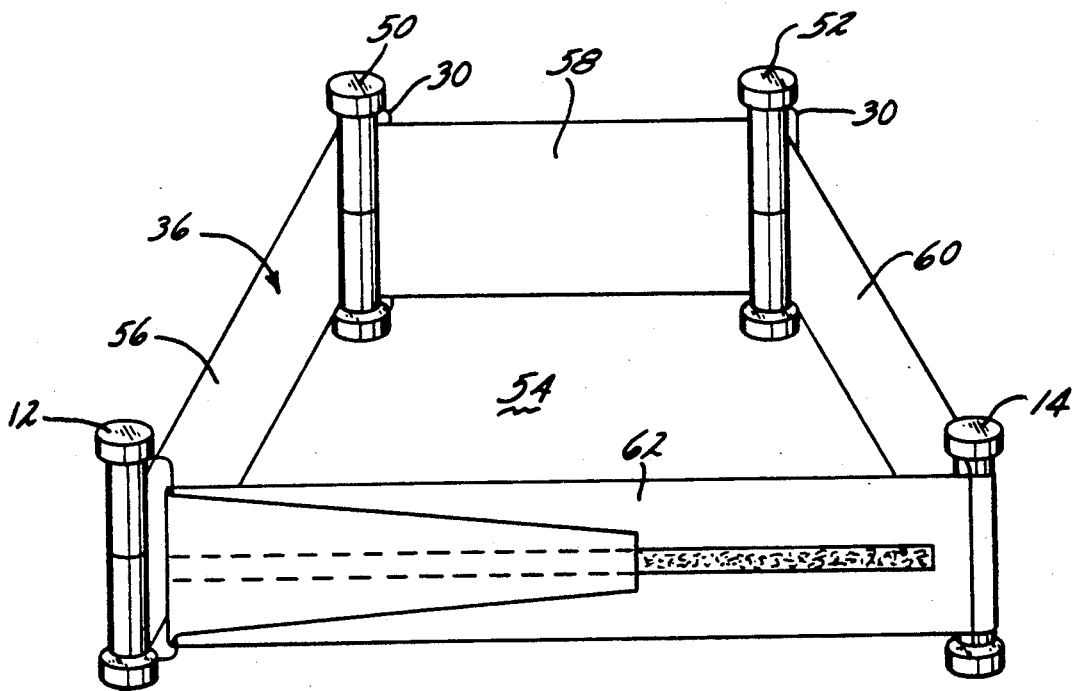
FIG. 2 is a perspective view of a second embodiment of the article restraint system of the present invention.

Referring now to FIG. 2, if it is desirable to increase the article storage space or define a differently shaped storage space, intermediate posts 50 and 52 may be added to the system. Each post 50 and 52 may be placed in a desired position relative to the posts 12 and 14 and may be adjusted to contact the upper and lower surfaces (not shown) of the storage compartment. Each post 50 and 52 preferably has a substantially C-shaped guide rod 30 attached thereto by a lower stationary ring member 32 and an upper slip ring member 34.

In this arrangement, the fabric 36 is at least partially wrapped around the intermediate posts 50 and 52 and threaded through a containment space defined by an outer surface of each intermediate post 50 and 52 and its respective guide rod 30 so as to define an article storage space 54 bounded by the walls 56, 58, 60 and 62. Here again, the fabric 36 may be placed in a taut and locked condition by applying tension to the free end of the fabric, passing the fabric around the guide rod 30 attached to the post 12, and folding it back onto the VELCRO strip material on wall 62.

Figure 3:
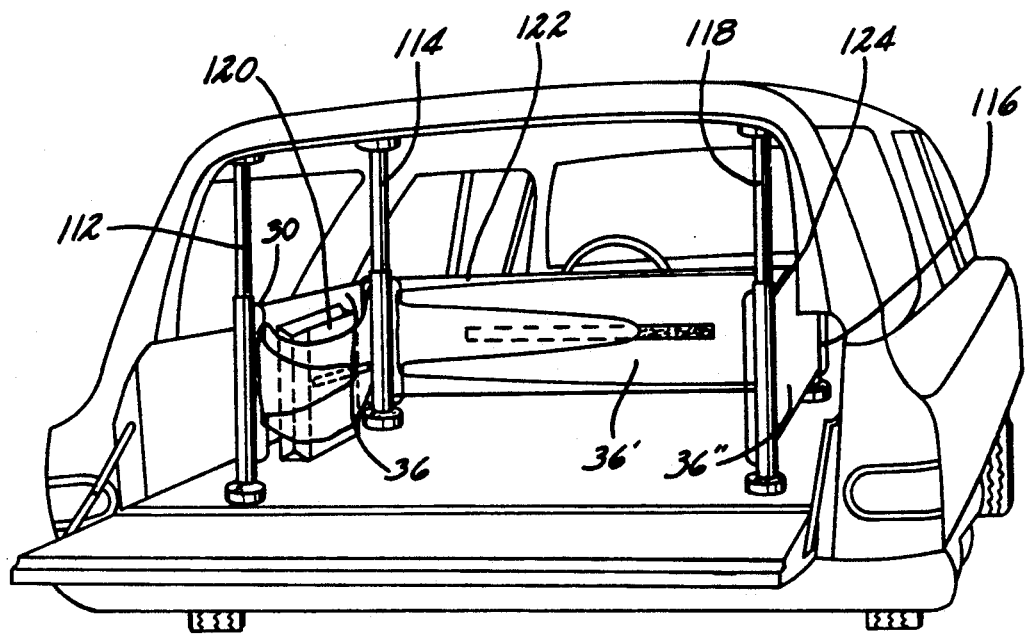
FIG. 3 is a perspective view of a third embodiment of the article restraint system of the present invention.

FIG. 3 illustrates yet another embodiment of the article restraining system of the present invention. In this embodiment, a plurality of adjustable length posts 112, 114, 116 and 118 are placed at desired locations within a storage compartment. The posts 112 and 118 each having one substantially C-shaped guide rod 30 mounted thereto, while the posts 114 and 116 have two such guide rods 30 secured at right angles to each other. This embodiment of the present invention differs from the other embodiments in that three of the posts 112, 114 and 116 act as base posts and respectively have a piece of fabric material 36, 36' and 36" secured thereto in the manner previously described. As before, the free end of each piece of fabric material is at least partially wrapped around an adjacent post, threaded through a space defined between an outer surface of that post and its attached guide rod, and back around the guide rod on the base post. Using this arrangement, it is possible to form a plurality of spaces 120, 122, and 124 in which articles can be confined.

It should be recognized that the adjustable article restraint system of the present invention may be used in a wide variety of storage compartments such as automobile trunks, cargo spaces in trucks, vans and station wagons, and cargo holds on ships and planes.

While it is preferred to use VELCRO fasteners to secure the fabric material in a taut and locked condition, it should be recognized that other fasteners such as clips or buckles could be used if desired.

It is apparent that there has been provided in accordance with this invention an adjustable restraint system for articles which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An adjustable restraint system for confining articles within a desired spaced within a storage compartment, said system comprising:
    at least two posts to be positioned within said storage compartment;
    each said post being wedged between two spaced apart surfaces of said storage compartment;
    a piece of fabric material secured to a first one of said posts, said piece of fabric material being used to define said space in which said articles are placed and to restrain said articles;
    a first substantially C-shaped guide rod attached to a second one of said posts; and
    said piece of fabric material being at least partially wrapped about said second one of said posts and being threaded through a space defined by said first substantially C-shaped guide rod and a surface of said second one of said posts.

2. The restraint system of claim 1 wherein each of said posts is adjustable in length so as to facilitate use of the restraint system in different sized storage compartments.

3. The restraint system of claim 1 wherein each of said posts has an upper pad and a lower pad for contacting said spaced apart surfaces of said storage compartment.

4. The restraint system of claim 3 wherein said upper and lower pads are each formed from an elastomeric material.

5. The restraint system of claim 1 further comprising:
    a second substantially C-shaped guide rod secured to said first one of said posts; and
    said piece of fabric material being threaded through a space between said second substantially C-shaped guide rod and an outer surface of said first one of said posts.

6. The restraint system of claim 5 further comprising:
    at least two intermediate posts positioned between said first and second ones of said posts;
    each said intermediate post having a substantially C-shaped guide rod secured thereto; and
    said fabric being at least partially wrapped about each said intermediate post and being threaded through a containment space defined by a surface of each said intermediate post and the guide rod secured thereto.

7. The restraint system of claim 6 wherein each said guide rod is secured to its respective post by a lower stationary ring member and an upper slip ring member.

8. The restraint system of claim 1 further comprising:
    means for maintaining said piece of fabric material in a taut condition; and
    said maintaining means comprising a strip of fastening material attached to a surface of said piece of fabric material so that when said fabric material is folded back over itself two pieces of said fastening material contact each other.

9. The restraint system of claim 1 wherein said piece of fabric material comprises a piece of canvas.

10. The restraint system of claim 1 wherein said piece of fabric material comprises a piece of heavy canvas material.

11. An adjustable restraint system for use in a vehicle storage compartment comprising:
    a first adjustable height post positioned within said compartment, said post having its height adjusted so that a lower portion of said first post is in contact with a lower surface of said compartment and an upper portion of said first post is in contact with an upper surface of said compartment;
    a second adjustable height post positioned within said compartment and spaced from said first post, said second post having its height adjusted so that a lower portion of said second post is in contact with said lower surface of said compartment and an upper portion of said second post is in contact with said upper surface of said compartment;
    a piece of fabric for defining a storage space with said posts in which articles may be placed;
    means for maintaining said piece of fabric in a taut condition so as to restrain movement of said articles in said storage compartment;
    at least two adjustable height posts intermediate said first and second posts for further defining the storage space, each intermediate post having an upper portion contacting the upper surface of said storage compartment and a lower portion contacting the lower surface of said storage compartment;
    said piece of fabric being at least partially wrapped about said intermediate posts; and
    said first post having a guide rod attached thereto and said piece of fabric being held taut by being at least partially wrapped about said guide rod and folded over on itself.

12. The article restraint system of claim 11 wherein said second post and said intermediate posts each have a guide rod secured thereto and said piece of fabric defining said storage space passing between a surface of each of said second and intermediate posts and said guide rods secured thereto.

13. An article restraint system for use in a storage compartment comprising:

four posts positioned within said storage compartment;

pieces of fabric secured to three of said posts;

means for defining three article storage spaces within said storage compartment using said pieces of fabric and said posts; and said article storage space defining means comprising guide rods attached to said posts bout which said pieces of fabric may be at least partially wrapped.

* * * * *